L. B. CURTIS & C. E. JOSSELYN.
TAPER THREAD CUTTING MACHINE.
APPLICATION FILED DEC. 17, 1913.

1,115,055.

Patented Oct. 27, 1914.
2 SHEETS—SHEET 1.

Witnesses
Fenton S Belt
M. I. Lougden

Inventors
L.B. Curtis and
C.E. Josselyn
By
Attorney

L. B. CURTIS & C. E. JOSSELYN.
TAPER THREAD CUTTING MACHINE.
APPLICATION FILED DEC. 17, 1913.

1,115,055.

Patented Oct. 27, 1914.

2 SHEETS—SHEET 2.

Witnesses
Fenton S. Belt
M. J. Lougden

Inventors
L. B. Curtis and
C. E. Josselyn

By
Attorney

UNITED STATES PATENT OFFICE.

LEWIS B. CURTIS AND CHESTER E. JOSSELYN, OF BRIDGEPORT, CONNECTICUT, ASSIGNORS TO THE CURTIS & CURTIS CO., OF BRIDGEPORT, CONNECTICUT, A CORPORATION OF CONNECTICUT.

TAPER-THREAD-CUTTING MACHINE.

1,115,055.   Specification of Letters Patent.   Patented Oct. 27, 1914.

Application filed December 17, 1913. Serial No. 807,204.

*To all whom it may concern:*

Be it known that we, LEWIS B. CURTIS and CHESTER E. JOSSELYN, both citizens of the United States, residing in the city of Bridgeport, county of Fairfield, and State of Connecticut, have invented certain new and useful Improvements in Taper-Thread-Cutting Machines; and we do declare the following to be a full, clear, and exact description of the invention, such as will enable others skilled in the art to which it appertains to make and use the same.

This invention relates to the subject of screw thread cutting, and has particularly in view a machine for cutting tapering threads.

The main object of the invention is to provide a taper thread cutting machine in which the parts thereof can be readily assembled or taken apart, and in which the thread cutters are positively held against vibratory or other thread-damaging movements and in which the cutters are positively moved longitudinally of the pipe, rod or other article, while being held against any movement that would damage the thread being cut.

In producing a machine capable of carrying out the objects of the invention as generally stated above, it will be understood that the same is susceptible to changes in details and structural arrangements, one simple and practical embodiment thereof being shown in the accompanying drawings, wherein—

Figure 1:
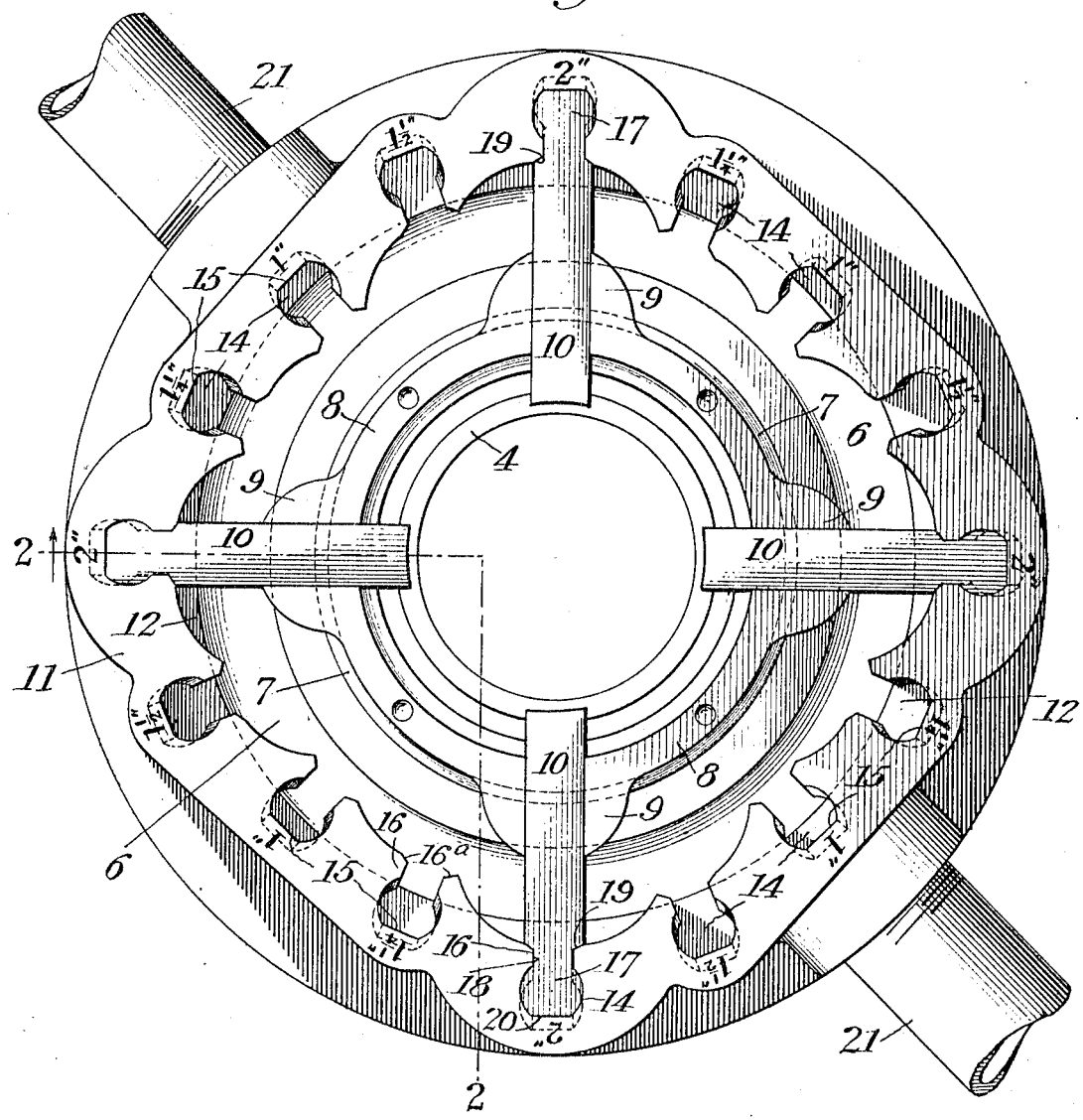
Figure 4:
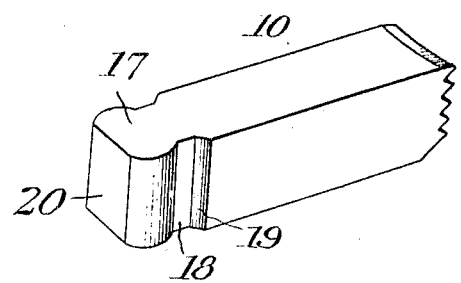
Figure 2:
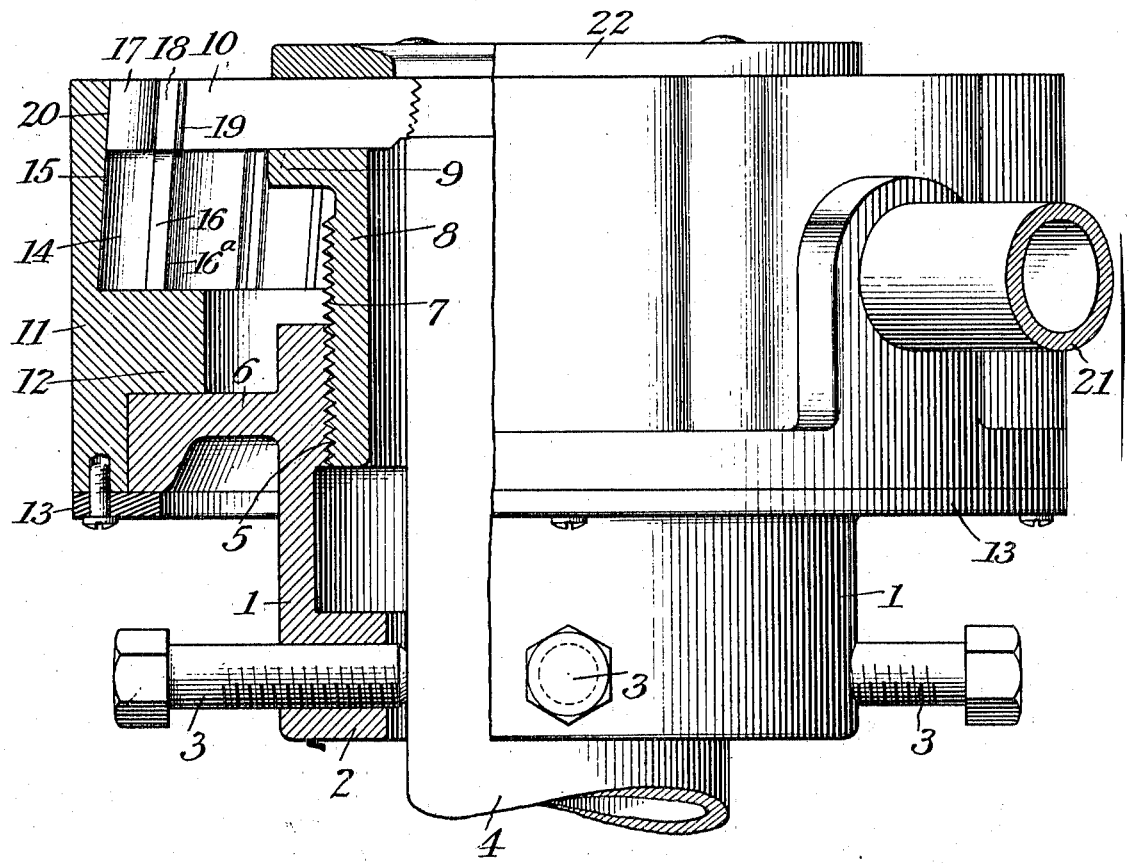
Figure 3:
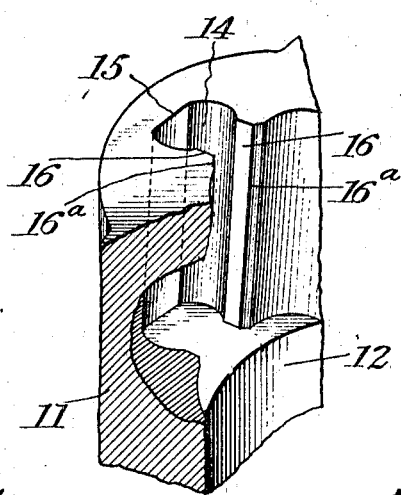

Figure 1 is an end view of the improved taper thread cutter. Fig. 2 is a side elevation, partly in section, the section being taken on the line 2—2, Fig. 1. Fig. 3 is a fragmentary perspective view of a portion of the guide sleeve showing one of the cutter guides therein. Fig. 4 is a detail perspective view of a cutter or die adapted for use in connection with this invention.

The improved taper thread cutting machine comprises in its general organization a stationary frame or holder 1 having an internal annular flange 2 at one end through which the bolts 3 extend for clamping the pipe or other article 4 that is to be threaded. The opposite end of the frame may be thickened as indicated in Fig. 2 for strengthening purposes, and is provided with the internal threads 5. At a point preferably intermediate of the threads 5, the holder 1 is provided with a flat external annular flange or ledge 6.

The internal threads 5 of the holder 1 are engaged by the external threads 7 of the die carrying sleeve 8, said sleeve 8 having end flanges 9 forming seats for dies 10, said dies being especially designed for use in connection with this machine, as will be apparent from the following description.

A guide sleeve 11 surrounds the carrying sleeve 8 in spaced relation and has an internal annular flange 12 that seats on the ledge 6 of the holder 1. The sleeve 11 incloses the ledge 6 and it has a holding ring 13 bolted or otherwise detachably fastened to its base that overlaps the base of ledge 6, the arrangement being such that the said sleeve 11 can be rotated on said ledge, but relative longitudinal movements of the sleeve and ledge are prevented. Internally, and beyond the flange 12, the sleeve 11 is provided with a plurality of rounded radial grooves 14 that are inclined and extend longitudinally of said sleeve, the flange 12 forming the bottom of each of said grooves. The inclined rear wall 15 of each groove forms a cam surface, and at the front, each groove is contracted to form the oppositely disposed ribs 16 which are inclined in parallel relation to the cam surfaces 15 and have beveled sides 16ᵃ. The cutting dies are made to conform to the shape of the grooves 14 by forming opposite sides of the junction of their bodies and heads 17 with inclined grooves 18 which are of a size to snugly receive the ribs 16 and have beveled sides 19. The sides of the heads 17 are rounded and their free ends are flat and inclined, as indicated at 20, correspondingly with the inclination of the cam surfaces 15.

With the described shape of the grooves 14 and heads 17 of the dies 10 in mind, it will be seen that said heads will snugly, but slidably fit in the said grooves, the grooves 18 of the heads interlocking with the ribs 16 and the ends 20 of the heads slidably contacting with the cam surfaces 15 of the grooves 14. The guide sleeve 11 is provided with handles 21 by means of which said sleeve may be rotated relatively to the holder 1 and sleeve 8. A ring or cover 22 may be bolted or otherwise detachably fastened to the sleeve 8 over the dies or cutters 10, indicated in Fig. 2 of the drawings, to prevent said dies moving longitudinally of said sleeve; but such ring permits the dies to freely slide transversely of sleeve 8.

As is clearly shown in Figs. 1 and 2 of the drawings, the dies or cutters 10 are firmly held in the grooves 14 of sleeve 11 against transverse movements relative to said sleeve, the engagement between said dies and the ribs 16 being a snug interlocking one, yet such dies are freely slidable longitudinally of said grooves. The grooves 14 and ribs 16 being inclined, and the heads 17 of the dies being correspondingly shaped, it will be apparent that movements of the dies longitudinally of the grooves produces a cam action that causes said dies to move transversely of the sleeve 8.

As aforesaid, the sleeve 8 is threaded to holder 1; sleeve 11 is rotatably attached to flange 6 of holder 1, and the dies 10 are held to the sleeve 8 against movements longitudinally of said sleeve 8. It will therefore be clear that when sleeve 11 is rotated by means of the handles 21, or otherwise, the dies 10 will rotate sleeve 8, and said sleeve 8, through its threaded connection with holder 1, will move longitudinally of said holder and in such movements, the dies 10 will travel with sleeve 8 causing them to slide longitudinally in the cam grooves 14 with the result that the said dies will simultaneously move transversely of the ring 8.

The grooves 14 are open at their outer ends, as clearly shown in Fig. 2, and it will be understood that by causing the sleeve 8 to move outward, the dies will slide from said grooves, whereupon the said dies can be readily withdrawn from between the sleeve 8 and the ring or other holder 22. This arrangement obviously facilitates the removal or replacement of the dies.

It will be observed by referring to Fig. 1, that the sleeve 11 is provided with a plurality of sets of grooves or sockets 14, the members of each set being diametrically opposite. By this arrangement a plurality of sizes of pipes or rods may be threaded with the same dies. For example, as shown the dies are set for a 2″ pipe. If a 1″ pipe is to be operated on, the dies would be shifted to the 1″ sockets. The drawings show the sockets arranged for pipes or rods of sizes from 1″ to 2″, but of course more or less could be used.

From the foregoing description it will be seen that this invention provided simple and efficient means whereby the dies, through their interlocking engagement with the grooves or sockets of the sleeve 11, are firmly held against and vibratory movements that would damage the threads, yet such dies are freely movable to the different necessary positions for cutting tapering threads.

As has been explained, the sleeve 11 has its die sockets 14 arranged in sets for various sizes of work. And it has been explained that a continued outward movement of the carrier 8 will lift the dies 10 from the sockets. Such arrangement and operation of the parts facilitates shifting the dies from one set of sockets to another set, in that when the dies are lifted from said sockets they are still held to the carrier, whereupon by rotating either the guide 11 or the carrier 8, the dies may be alined with and readily placed in the desired sockets.

What we claim as our invention is:—

1. A taper threading machine comprising a work holder, a die carrier movable longitudinally thereof, a die guide having internal longitudinally extending inclined sockets provided with oppositely disposed inclined ribs, and a die seated on and transversely movable of the carrier and provided with means for interlocking with the sockets and the ribs to prevent transverse movement of the die relative to the sockets and permit longitudinal movements of the die relatively to the sockets.

2. In a taper threading machine, the combination with a work holder, of a die carrier movable longitudinally thereof, a die guide rotatably fastened to the holder and provided with internal die sockets that are inclined and provided with ribs, and dies having heads provided with inclined ends that are slidable longitudinally of said sockets and having side grooves that interlock with the ribs.

3. A taper threading machine comprising a work holder, a die carrier carried thereby, a guide rotatably mounted on the holder and provided with a plurality of internal, longitudinally extending die sockets arranged in radial relation, said sockets being longitudinally inclined and having contracted open sides provided with oppositely disposed ribs, and dies having heads shaped to interlock with the sockets and provided with side grooves to interlock with the ribs.

4. A taper threading machine comprising a work holder, a die carrier movable longitudinally thereof, a plurality of dies carried by and slidable transversely of the carrier, means for preventing the dies moving lengthwise of the carrier, said dies having heads provided with inclined side grooves, and a die guide having a plurality of inclined sockets and inclined ribs with which said head and grooves interlock.

5. A taper threading machine including a die carrier, a guide rotatable relative to the carrier and provided with internal sockets that are longitudinally inclined and provided with flat inclined rear walls and having a contracted open side provided with inclined ribs that are parallel to said rear wall, and dies having heads shaped to snugly but slidably fit in the sockets and provided with side grooves with which the ribs interlock.

6. A taper threading machine comprising a work holder having an external annular ledge, a carrier carried by and movable longitudinally of the holder, a guide surrounding the carrier in spaced relation and having an internal flange seated on one surface of said ledge, means for fastening the guide to the opposite surface of said ledge to prevent other than rotary movements of said guide, and dies seated on the carrier and guided by the guide.

7. In a taper threading machine a die carrier, a rotatable guide provided with a plurality of die guiding sockets arranged in radial relation, said sockets being arranged in sets that are arranged in graduated relation relative to the size of the work that is to be threaded and provided with means for interlocking with dies, and dies adapted for selective engagement with the sets of said sockets and the interlocking means thereof.

8. In a taper threading machine, a die carrier having a plurality of internal radially disposed longitudinally extending cam sockets provided with ribs, and dies having heads shaped for firm interlocking engagements with the sockets and ribs to prevent the dies having movements other than longitudinally of said sockets.

9. In a taper threading machine the combination with a work holder, a die carrier longitudinally movable thereof, a plurality of radially arranged dies normally held to the carrier, and a die guide surrounding the carrier in spaced relation and rotatably connected to the holder, the carrier being adapted to be projected beyond the guide to remove dies from said guide and said guide being provided with a plurality of sets of radially arranged die sockets adapted to be selectively placed in positions to receive the dies carried by the carrier.

In testimony whereof we affix our signatures in presence of two witnesses.

LEWIS B. CURTIS.
CHESTER E. JOSSELYN.

Witnesses:
M. A. HOPKINS,
F. W. SMITH, Jr.